United States Patent [19]
Nelson

[11] Patent Number: 4,516,055
[45] Date of Patent: May 7, 1985

[54] ELECTRONIC DISPLAY DIMMING CIRCUIT
[75] Inventor: David A. Nelson, Cedar Rapids, Iowa
[73] Assignee: Rockwell International Corporation, El Segundo, Calif.
[21] Appl. No.: 499,084
[22] Filed: May 27, 1983
[51] Int. Cl.³ .............................................. H05B 37/02
[52] U.S. Cl. ..................... 315/151; 315/152; 315/155; 315/209 R; 315/307; 315/DIG. 4
[58] Field of Search ............... 315/307, 151, 152, 209, 315/155, DIG. 4

[56] References Cited
U.S. PATENT DOCUMENTS

| 2,233,879 | 3/1941 | Tolman | 250/209 |
| 3,577,039 | 5/1971 | Sanford | 250/209 |
| 3,883,778 | 5/1975 | Kaji et al. | 315/DIG. 4 |
| 3,965,388 | 6/1976 | Brisk | 315/155 |
| 3,977,792 | 8/1976 | Jumonji et al. | 250/209 |
| 4,234,820 | 11/1980 | Widmayer | 315/155 |

Primary Examiner—Harold Dixon
Attorney, Agent, or Firm—Robert C. Mayes; George A. Montanye; H. Fredrick Hamann

[57] ABSTRACT

A display dimming circuit is disclosed which provides a coordinated automatic display brightness level adjustment for a plurality of instruments associated within the same general region. Its use in an aircraft cockpit, for example, allows the left, or captain's instruments, to be coordinated to be responsive to the ambient light in that region of the cockpit and the co-pilot's bank of instruments, or right region, of the aircraft is separately coordinated such that both regions exhibit appropriate brightness levels on all instruments. In this manner, gas discharge displays, for example, are installed adjacent cathode ray tube displays or vacuum fluorescent displays and all are effectively maintained at an appropriate lighting level.

5 Claims, 2 Drawing Figures

ELECTRONIC DISPLAY DIMMING CIRCUIT

CROSS REFERENCE

Cross reference is made to the co-pending U.S. patent application Ser. No. 6/408,315 entitled, "Angular Response Enchanced Lens Structure" filed 16 Aug. 1982, by John F. Turner, and assigned to Rockwell International Corporation, the assignee of the present application.

TECHNOLOGICAL AREA

This invention relates to electronics in general and in particular to lighted display dimmer circuits.

BACKGROUND

Various circuits have been used widely in lighted displays to control the emissive characteristic of displays such as cathode ray tubes, gas discharge panels, incandescent lighting, and light emitting diodes. Generally speaking, these circuits utilize a variable voltage source controlled by a photo sensor such as a cadmium sulfide photo resistor, to provide a voltage input into the lighting power control circuitry.

The advent of digital processing in Avionics and other precision equipment has allowed the use of micro processor controlled displays for segment configuration (annunciation control) as well as brightness control.

Problems, however, have been observed when utilizing different types of displays in a closely adjacent relationship wherein differences in the circuitry as well as the different characteristics of the respective displays result in varying readability amongst the display units under varying conditions of ambient light.

Additionally, typical display units will have individually controllable dimmer circuits for controlling the brightness level of each box individually, and thereby may develop significant variations among units.

In an avionics environment, it is desirable to maintain high readability under all conditions of ambient lighting amongst all display units. If the response characteristics of the displays are such that varying lighting conditions, for example while flying through broken clouds, results in varying readability characteristics amongst the displays, a potentially hazardeous situation results.

SUMMARY

Briefly, and in accordance with the present invention, a coordinated display brightness control system comprises a plurality of digital processor units disposed in a proximal relationship, each to the others, each having an emissive display and an ambient light intensity sensor means, wherein each display is responsive to modify emissive brightness as a function of the ambient light intensity sensed by the respective sensor means and is controlled by the respective digital processor unit. Furthermore, means are included for coordinating at least two of the plurality of units with respect to emissive brightness by interconnection of the respective sensor means. In this embodiment the emissive brightness of each of the controls are matched, each to the others within a group of displays, as well as being optimized for the specific environment in which utilized.

In an alternative embodiment, an additional input means is included and coupled to the sensor means for manually inputing an additional signal into the means for coordinating.

A significant feature of the present invention is the ability to take full advantage of the micro-processor controlled dimming capability currently provided in many digital display units for the purpose of coordinating a large number of closely adjoining displays for optimizing readability.

Another significant feature of the present invention is the requirement for but a single wire connection running from one display unit to the next for interconnection of the sensor means.

DETAILED DESCRIPTION OF THE INVENTION

Figure 1:
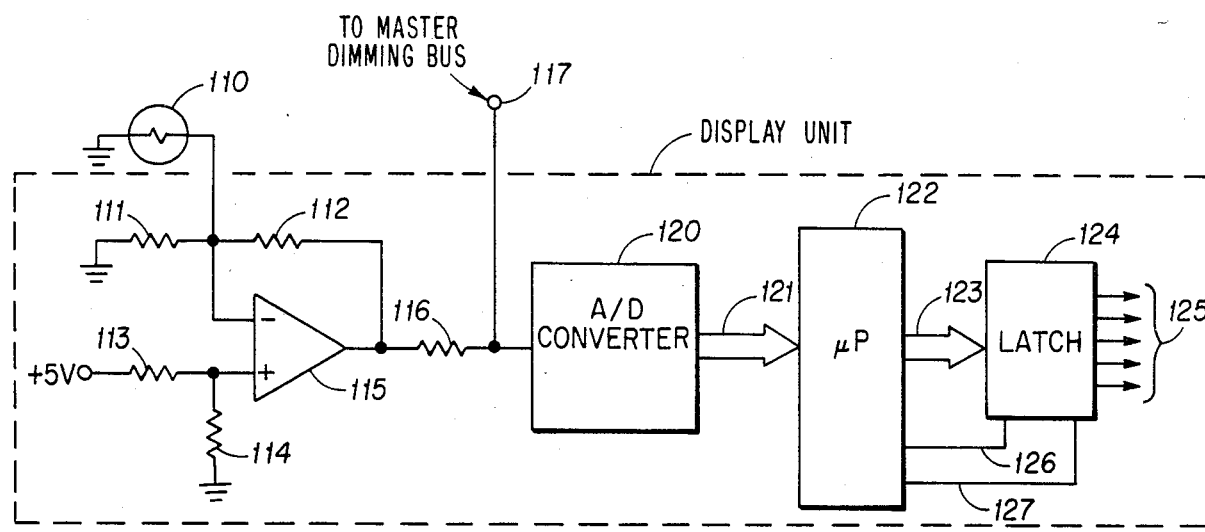
FIG. 1 is a schematic circuit diagram of one embodiment of the present invention in conjunction with the micro-processor control for a single display unit.

Referring now to FIG. 1, a schematic circuit diagram of one embodiment of the present invention is shown having a photo resistor 110 positioned to detect ambient light at the surface of a digital display unit. A photo resistor having approximately 300 kohms resistance in dark conditions and approximately 2 kohms under full light conditions was found to work very well in the present invention although alternative sensor units are also useful. The photo resistor 110 is coupled to resistors 111 and 112 and to the operational amplifier 115, such as a 741 operational amp manufactured by a variety of vendors, although other similar amps such as dual or quad configurations will work as well. Resistor 113 (4700 ohms) is coupled to the positive side of the amplifier 115 and through resistor 114 (2 kohms) to ground. Resistor 114 in a preferred embodiment is a trim potentiometer utilized for adjusting the voltage potential at the input of operational amp 115 to precisely adjust for various performance parameters of the respective components. Resistor 112 (6200 ohms) is utilized for obtaining appropriate gain in amplifier 115. Resistor 116 is 4700 ohms and is coupled to the output of amplifier 115, to the analog to digital converter 120, as well as to a sensor interconnect bus connection 117. In alternative embodiments, a diode may be positioned between resistor 116 and the connection of resistor 112 to the output of operational amp 115 and thereby provide isolation for the respective display unit when it is inoperative. In such a case, the single wire bus 117 is not affected by any interconnected unit which may be off or which has failed.

All of the circuitry described and shown in FIG. 1 is contained within a single display unit and it can be seen that by utilizing connection 117 in similar display units the output of the amplifier through resistor 116 is coupled to the respective analog-to-digital converters at the same circuit potential location. It is important to note that each of the units may utilize different photo resistors 110 in their construction as well as different operational amplifiers 115 and feedback resistors 112. However, each should have a 4700 ohm resistor 116 for providing a balanced input both to the respective analog-to-digital converter 120 and to the sensor interconnect bus 117. In this manner, each display unit's respective photo sensor provides a voltage potential on bus 117 which is averaged by interconnection to the others and thereby a similar analog voltage is presented to each of the analog-to-digital converters in all of the interconnected displays. Thereafter, difference in the bus 121 will be compensated appropriately by the respective micro-processor 122 in each display to provide an output 123. A timed control signal on the clock line 126 from the micro-processor to latch 124 and a signal on the enable line 127 again from the micro-processor 122 to latch 124, thereby generates appropriate segmentation signals 125 for controlling the annunciation of the respective display as well as the on time for that display, in this example a multi-segmented gas discharge display.

Various techniques for micro-processor control of light emitting diodes, gas discharge displays, vaccuum fluorescent lighting, as well as incandescent lighting and others are well known in the art. The advantage of the present invention is to provide a single analog input averaged over each of the photo sensors for each display into all of the interconnected units. This provides an optimized and balanced display characteristic for all units in the same relative region while utilizing a single wire 117 for the interconnection.

It should be noted that the single wire interconnection capability of the present invention is particularly advantageous in aircraft wherein multiple lines equate to a significant weight overhead when permanently installed in an aircraft. The present invention overcomes this problem without the need for a serial data interconnection and the related data generation and data interpretation hardware of a serial bus. Thus the single wire 117 equalizes the voltage input to each of the analog to digital converters of the displays and by adjusting the trim pot 114, the displays are optimized on installation. Thereafter their emission characteristic is coordinated.

Figure 2:
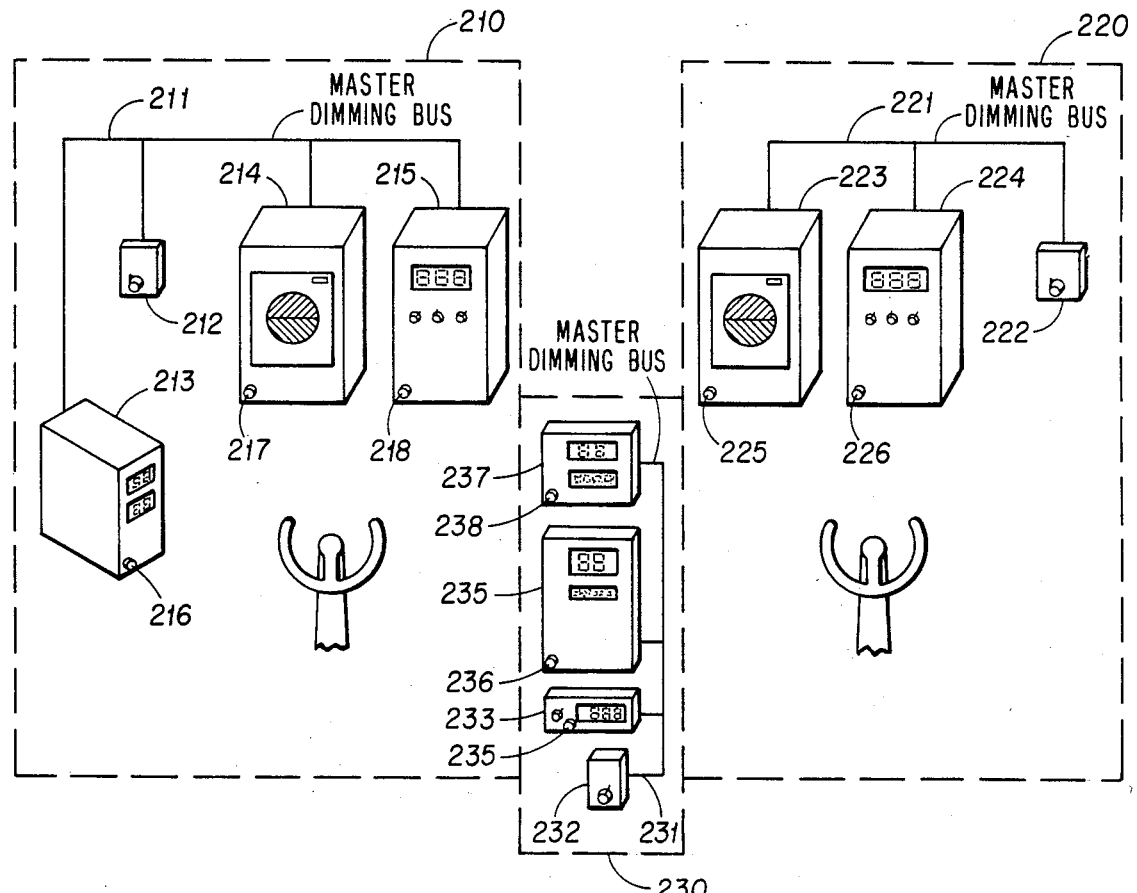
FIG. 2 is a display organization plan for an aircraft cockpit utilizing the present invention and having three separately controlled coordinated display regions within the cockpit.

Referring now to FIG. 2, an organization plan utilizing the present invention for a cockpit is shown having three separately coordinated zones in the aircraft.

Block 210 is the left or captain's portion of the display circuitry having digital display boxes 213, 214 and 215. All of the displays in the captain's region 210 are interconnected by a single wire 211 and furthermore are connected to a master dimmer control potentiometer 212. It should be noted that the master dimmer potentiometer 212 is an optional feature in alternative embodiments and by properly adjusting each of the displays upon installation, the master dimmer 212 is not a necessary feature of the invention.

Box 213 is a radio control unit having a light sensor 216 shown on the front panel. Display 214 is a cathode ray tube display for use as an attitude direction indicator. Light sensor 217 is shown on the front panel of box 214 and is sensitive to light impinging on the surface of that display. Display 215 is a course indicator utilizing gas discharge display technology to present the course of the aircraft in degrees and additionally has a light sensor 218 mounted on the face thereof.

The box 220 is the co-pilot's or right region of the cockpit and is shown having the CRT attitude director indicator 223 with its sensor 225 connected through the single wire bus 221 to the course indicator 224 and the master dimmer control 222. It can be seen by utilizing the single wire interconnect 221, that the redundancy obtained with sensors 225 and 226 will enable both boxes to remain fully functional with respect to variable brightness output should either sensor fail as an open circuit. As is known in the art, should either sensor fail as a short circuit, the micro-processors are programmed to maintain maximum brightness output and thereby maintain readability until repairs can be made.

Again the master dimmer control potentiometer 222 is not necessary to the proper functioning of the system shown in block 220 but may be desired in certain embodiments.

Additionally, the probability that the co-pilot's portion of the displays in an aircraft cockpit will be exposed to different lighting conditions on the right side of the aircraft than those of the pilot on the left side is very high. Under bright light conditions with strong sun light, the region of the cockpit exposed to the bright rays of the sun will require a brighter emission characteristic than those displays in a shaded portion of the cockpit. Therefore, it is useful under these conditions to partition the light coordination from left to right. In alternative embodiments, such as a small aircraft having closely adjacent pilot and co-pilot seating, it may be desirable to interconnect all of the displays so that each unit receives essentially the same analog voltage into its respective analog-to-digital converter.

Alternatively, in relatively large cockpits, additional segmentation of the coordinated regions may be desired as is shown in block 230 having the radio control boxes 233, 235 and 237 interconnected to the single sensor bus 231 and to an additional master control potentiometer 232. Each of the radio control boxes has its respective light sensor 234, 236 and 238, thus providing sensor redundancy.

The ability to interconnect radio control units as in block 230 utilizing different display technologies in each unit provides a significant advantage to the aircraft cockpit designer as well as in other applications requiring coordinated display brightness.

While the present description of the invention is made with respect to specific embodiments, it can be seen that the circuit utilized as well as the interconnection technique is not limited to those embodiments but may be adapted to variety of applications as may become obvious to those well skilled in the art. Since modifications to the foregoing description may occur to those skilled in the art which may very well may not constitute a departure from the scope and spirit of the invention, the description is intended to be merely exemplary, and it is therefore contemplated that the appended claims will cover any such modifications of embodiments as fall within the true scope of the invention.

I claim:

1. A coordinated display brightness control system comprising:
    a plurality of digital processor units disposed in a proximal relationship, each to the others, each having an emissive display and an ambient light intensity sensor means, said sensor means including a feedback amplifier having an impedance element coupled to, and further including, an analog-to-digital converter, wherein each display is responsive to modify emissive brightness as a function of the ambient light intensity sensed by the respective sensor means and controlled by the respective digital processor unit coupled to said analog-to-digital converter; and
    means for coordinating at least two of said plurality of units with respect to emissive brightness by interconnection of said respective impedance elements.

2. A system as in claim 1 further comprising an additional input means coupled to said sensor means for manually inputting an additional signal into said means for coordinating.

3. In a digital apparatus having a plurality of units, each unit having a data processor coupled to a display capable of variable brightness wherein the brightness of each of said displays is controlled by the respective data processor, a coordinated brightness control system comprising:
 a. a plurality of ambient sensing means for providing data input into each of said data processors including a feedback amplifier having an impedance element output and, coupled thereto, an analog-to-digital converter for each of said sensing means and coupled to each respective data processor; and
 b. interconnection means for coupling each of said sensing means, each to the others, at said impedance element output and therby providing a substantially similar data input into each of said data processors.

4. In a digital apparatus having a plurality of units, each unit having a data processor coupled to an emissive display capable of variable brightness wherein the brightness of each of said displays is controlled by the respective data processor, and having a plurality of ambient sensing means for providing data input into each of said data processors respectively and coupled thereto, the improvement comprising:
 said ambient sensing means including a feedback amplifier having an impedance element output;
 said data processor including an analog-to-digital converter input for coupling to said impedance element output; and
 a single conductor for coupling each of said sensing means at said impedance element output, each to the others, and thereby providing a substantially similar data input into each of said data processors.

5. An apparatus as in claim 4 further comprising a manual input control coupled to said single conductor for controlling brightness of all said displays coupled to said single conductor.

* * * * *